(12) United States Patent
Wolford et al.

(10) Patent No.: US 12,452,136 B1
(45) Date of Patent: Oct. 21, 2025

(54) SMART RADIO-BASED TASKING ALLOCATION FOR EDGE NETWORKS

(71) Applicant: ROCKWELL COLLINS, INC., Cedar Rapids, IA (US)

(72) Inventors: Brian Wolford, Cedar Rapids, IA (US); Alexei Tchernoraenko, Iowa City, IA (US); Timothy Arganbright, Cedar Rapids, IA (US); Joshua Slagle, Marion, IA (US); Jesse Lane, Mount Pleasant, SC (US); Logan Swayne, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 18/642,192

(22) Filed: Apr. 22, 2024

(51) Int. Cl.
*H04L 41/12* (2022.01)
*H04L 67/12* (2022.01)

(52) U.S. Cl.
CPC .............. *H04L 41/12* (2013.01); *H04L 67/12* (2013.01)

(58) Field of Classification Search
CPC ................................ H04L 41/12; H04L 67/12
See application file for complete search history.

(56) References Cited

U.S. PATENT DOCUMENTS

| | | | | |
|---|---|---|---|---|
| 8,341,236 B1 * | 12/2012 | Ganesan | ............... | H04L 51/222 709/224 |
| 9,077,608 B2 * | 7/2015 | Zhu | ........................... | H04L 45/02 |
| 9,210,385 B2 * | 12/2015 | Huang | ..................... | G06F 18/24 |
| 10,153,946 B2 * | 12/2018 | Pugaczewski | .......... | H04L 41/12 |
| 10,505,622 B1 * | 12/2019 | Stein | ........................ | H04W 4/40 |
| 11,876,855 B2 * | 1/2024 | Amacker | ............... | G06F 9/5094 |
| 2006/0184553 A1 * | 8/2006 | Liu | ........................ | G06F 16/252 |
| 2013/0103739 A1 * | 4/2013 | Salgueiro | ................ | H04L 45/02 709/203 |
| 2013/0191843 A1 | 7/2013 | Sarkar et al. | | |
| 2014/0052863 A1 * | 2/2014 | Hart | .................... | H04L 61/5038 709/226 |
| 2016/0234095 A1 * | 8/2016 | Shetty | ..................... | H04L 45/02 |
| 2019/0072637 A1 * | 3/2019 | Pham | ...................... | G01S 1/045 |

(Continued)

FOREIGN PATENT DOCUMENTS

| CN | 113613206 A | 11/2021 |
|---|---|---|
| CN | 114189891 A | 3/2022 |

(Continued)

OTHER PUBLICATIONS

European Search Report dated Sep. 9, 2025 issued in corresponding application 25166117.9.

*Primary Examiner* — Faruk Hamza
(74) *Attorney, Agent, or Firm* — Millen, White, Zelano & Branigan P.C.; William F. Nixon (57) ABSTRACT

A system includes a master node and at least one worker node connected over a network. The master node includes a stack executable on a node within a cloudlet within the system. The stack includes a rule engine that includes rules and facts. The rule engine is accessible via an application programming interface (API) from plugins. The rule engine includes rules and facts. The rule engine also has access to network topology information pulled from the network. The rule engine uses the network topology information in allocating low-level tasks for a high-level task to worker nodes. The network topology information optimizes the performance of tasks within the system.

16 Claims, 6 Drawing Sheets

(56) References Cited

U.S. PATENT DOCUMENTS

| | | | |
|---|---|---|---|
| 2019/0342396 A1* | 11/2019 | Tanabe | G06F 13/00 |
| 2021/0011494 A1* | 1/2021 | Artemjonoks | G05D 1/0044 |
| 2022/0400454 A1* | 12/2022 | Park | H04W 56/001 |
| 2023/0176577 A1 | 6/2023 | Ditty et al. | |
| 2024/0106714 A1* | 3/2024 | Kliem | H04L 61/255 |
| 2024/0338244 A1* | 10/2024 | Bellows | G06F 9/541 |
| 2025/0094731 A1* | 3/2025 | Graule | G06F 40/40 |
| 2025/0171020 A1* | 5/2025 | Chandra Shekar | G08G 1/0129 |
| 2025/0173085 A1* | 5/2025 | Fay | G06F 16/27 |
| 2025/0173195 A1* | 5/2025 | Tannenbaum | G06F 15/76 |
| 2025/0175804 A1* | 5/2025 | Mecheri Ravisubramanian | H04W 12/50 |

FOREIGN PATENT DOCUMENTS

| | | |
|---|---|---|
| CN | 112584347 B | 7/2022 |
| KR | 101661861 B1 | 9/2016 |

* cited by examiner

SMART RADIO-BASED TASKING ALLOCATION FOR EDGE NETWORKS

FIELD OF THE INVENTION

The present invention relates to using network information in task allocation within a network. More specifically, the present invention relates to using network topology information to allocate tasks in an edge network.

DESCRIPTION OF THE RELATED ART

Assets within a network include devices having a variety of types. Coordination between the devices is increasingly important. These assets are managed to complete tasks assigned to them. Completion of the tasks, however, may be time consuming and difficult for human operators to perform. Thus, a need may be appreciated for improving the allocation of tasks to the assets in the network as well as managing the completion of the tasks.

SUMMARY OF THE INVENTION

A method is disclosed. The method includes receiving a high-level task to be completed by a plurality of nodes configured in a network. The plurality of nodes includes a master node and a plurality of worker nodes. The method also includes dividing the high-level task into a plurality of low-level tasks. The method also includes retrieving network topology information corresponding to the network of the plurality of nodes. The method also includes generating a list of at least one worker node of the plurality of worker nodes for each of the plurality of low-level tasks based on a plurality of facts and a plurality of rules regarding the network using a rule engine. The plurality of low-level tasks is individually executable by the at least one worker node. The method also includes assigning each of the plurality of low-level tasks to an allocated at least one worker node of the list according to the network topology information using a task engine. The allocated at least one worker node includes a feature selected by the rule engine within the network topology information.

A master node within a network is disclosed. The master node includes at least one processor. The master node also includes a memory storing instructions. The instructions, when executed on the at least one processor, configure the at least one processor to receive a high-level task to be completed by a plurality of worker nodes controlled by the master node. The instructions also configure the at least one processor to divide the high-level task into a plurality of low-level tasks using a plugin of a plurality of plugins. The instructions also configure the at least one processor to retrieve network topology information corresponding to the network of the plurality of worker nodes. The instructions also configure the at least one processor to generate a list of at least one worker node of the plurality of worker nodes for each of the plurality of low-level tasks based on a plurality of facts and a plurality of rules regarding the network using a rule engine. The plurality of low-level tasks is individually executable by the at least one worker node. The instructions also configure the at least one processor to assign each of the plurality of low-level tasks to an allocated at least one worker node of the list according to the network topology information using a task engine. The allocated at least one worker node includes a feature selected by the rule engine within the network topology information.

A system is disclosed. The system includes a control station. The system also includes a cloudlet communicatively coupled to the control station by a network. The cloudlet includes a plurality of worker nodes. The cloudlet also includes a master node to control the plurality of worker nodes. The master node includes at least one processor. The master node also includes a memory storing instructions. The instructions, when executed on the at least one processor, configure the at least one processor to receive a high-level task to be completed by a plurality of worker nodes controlled by the master node. The instructions also configure the at least one processor to divide the high-level task into a plurality of low-level tasks using a plugin of a plurality of plugins. The instructions also configure the at least one processor to retrieve network topology information corresponding to the cloudlet of the plurality of worker nodes. The instructions also configure the at least one processor to generate a list of at least one worker node of the plurality of worker nodes for each of the plurality of low-level tasks based on a plurality of facts and a plurality of rules regarding the cloudlet using a rule engine. The plurality of low-level tasks is individually executable by the at least one worker node. The instructions also configure the at least one processor to assign each of the plurality of low-level tasks to an allocated at least one worker node of the list according to the network topology information using a task engine. The allocated at least one worker node includes a feature selected by the rule engine within the network topology information.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1a, or 1b. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes plural unless it is obvious that it is meant otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

As used herein, any reference to "one embodiment," "alternative embodiments," or "some embodiments" means that particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

The disclosed embodiments implement the tasking of assets, such as unmanned aerial vehicles (UAVs), car fleets, and the like, on the edge with heterogeneous radio networks. These processes use a smart service with knowledge of radio networks and topology. These features allow network health to be an intrinsic part of the tasking solution. They also increase system availability and overall capacity. The disclosed embodiments provide a combination of heterogenous networking with a task allocation engine. Smart data routing may occur using data traffic switching between traffic priority slices. Further, a baseline rules engine allows programmatic assignment of tasks to edge assets. This feature extends the assignment of tasks to allow assignment of tasking based on current radio health and topology. Cloud-based or "Internet of Things" (IoT) concepts are applied to edge networks.

According to the disclosed embodiments, a system may automatically match mission tasks to edge nodes based on complex criteria. Third party functions may use this framework to decompose complex mission functions into individual node tasks. A policy may be provided that is fully customizable for different missions or tasks, which may be changed without software reprogramming.

Task allocation and distribution capability is empowered by an engine operating on rule-based, or extendable, policies or on artificial intelligence (AI) principles. On a cloud node, the core of the functionality may be the task allocation, monitoring, or re-allocating decision loop. The engine processes events, gathers data and provides task allocation information based on the rules, or policies, and the data reflective of the state of the environment. The disclosed embodiments integrate heterogenous intelligent networking with the decision loop to further extend the cloud capabilities, thereby increasing system availability and overall capacity.

A use case may include real-time radio health and topology information. The act of feeding live radio health and topology information into the decision loop enhances node availability assessment and task allocation decision-making. For example, if node A is very far from node B and shows "worse" connectivity, then the rules engine may favor node B for a specific task.

Another use case may be smart data routing information. The integration of smart data routing information into task allocation or monitoring refines decision-making outcomes. For example, if the connectivity cost of node A is higher or a previously reliable channel becomes unavailable, then node A may not longer be the best candidate for the assigned task.

A use case also may be smart data routing and priority slice integration. The cloud, through the integration of smart data routing and priority slice information, not only consumes by enhances data management. Based on available information and policies, the cloud dynamically can switch data flow between traffic priority slices. For example, if the connectivity of node A improves on a "high reliability" channel, then the engine may decide to redirect navigation telemetry data flow accordingly.

Further, a use case may be extensibility through plug-ins. The cloud may incorporate plug-ins as extensibility points for third parties. The new types of information are available in the plug-ins and enrich their capabilities. For example, a surveillance plug-in may leverage real-time asset networking topology information to optimize the distribution and collection of image metadata.

An extensible approach for programmatically assigning tasks to nodes is disclosed. The extensible approach considers a fixed capability of the edge assets, dynamic conditions, and network topology information. The extensible approach includes a rule engine describing the capabilities of the edge assets and the requirements for mission tasks. The rule engine includes policy-based operation customization and programmatic interfaces for optimal matching of tasks to nodes. The extensible approach applies to edge networks that can be assigned various execution tasks in real-time. In some embodiments, the extensible approach uses IoT descriptors for platforms to advertise capabilities.

Figure 1A:
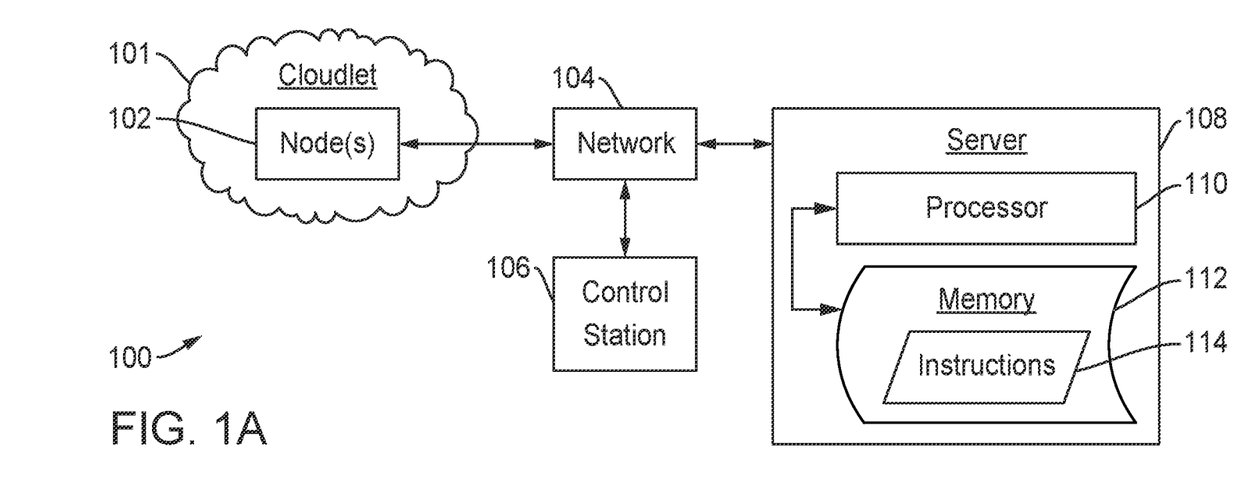
FIG. 1A illustrates a block diagram of a system according to the disclosed embodiments.
Figure 1B:
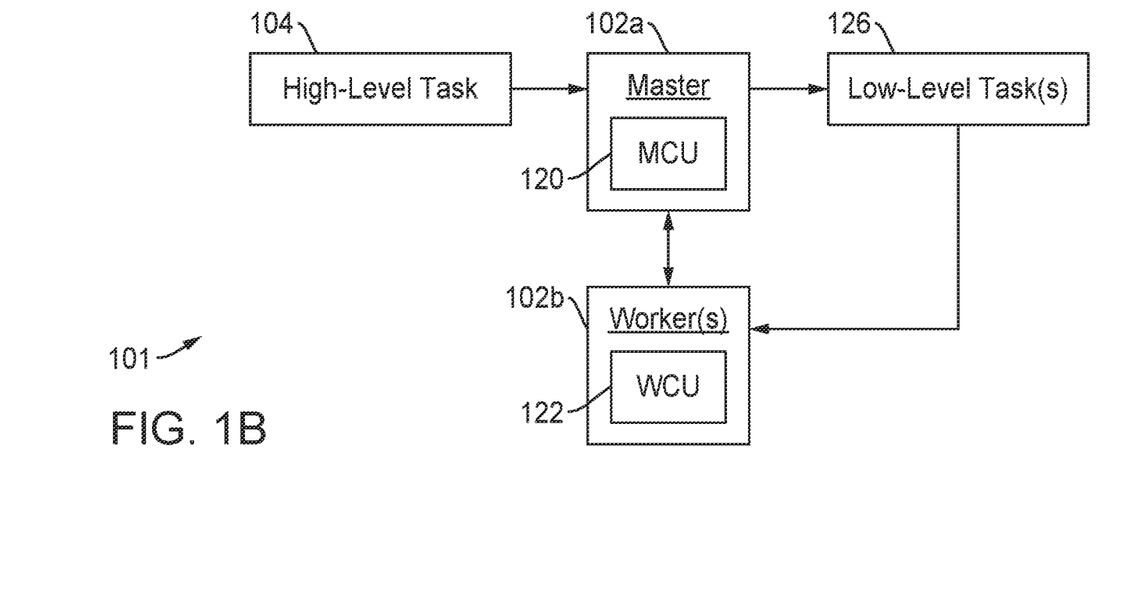
FIG. 1B illustrates a block diagram of a cloudlet of the system of FIG. 1A according to the disclosed embodiments.

FIG. 1A depicts a block diagram of a system 100 according to the disclosed embodiments. FIG. 1B depicts a block diagram of a cloudlet 101 of system 100 of FIG. 1A according to the disclosed embodiments. System 100 also may be referred to as an edge network or an edge management system. System 100 may include one or more nodes 102, a network 104, a control station 106, and a server 108. System 100 may include additional components that are not shown in FIG. 1A for brevity.

Nodes 102 may be any connected node. The connected nodes may include, but are not limited to, ground sensors, handheld radios, computers, aerial vehicles, unmanned aerial vehicles, and the like. Nodes 102 also may be implemented in a variety of applications, such as aircraft domains, delivery systems, large-scale distributed computing clusters, and the like. Nodes 102 may be referred to as edge assets in an edge network. Nodes 102 may be any edge asset.

For example, nodes 102 may include any computational node that performs tasks during an operation. In some embodiments, nodes 102 are aerial vehicles. The aerial vehicles may include any type of aerial vehicle, such as fixed-wing aircraft, a rotorcraft, jet-propelled vehicle, or rocket, balloon, airship, and the like. Fixed-wing aircraft may refer to aircraft with wings that are fixed to a bulkhead or fuselage of the aircraft. Rotorcraft may refer to aircraft with wings or rotors mounted on a spinning shaft. In some embodiments, the aerial vehicles are unmanned aerial vehicles (UAVs). The UAVs may include any type of the previously disclosed aerial vehicles. The UAVs may include any unmanned aerial vehicle including civilian drones, commercial drones, military drones, transport drones, and the like. The UAVs also may be referred to as a drone, an unmanned aircraft, and the like.

Control station 106 may be positioned remotely with respect to nodes 102. Control station 106 may be positioned within any ground control station, operation center, mobile control station, airborne control station, or the like. In some embodiments, control station 106 is an airborne early warning and control system (AWACS) aircraft. Control station 106 may provide tasks to nodes 102. System 100, for example, may be a remotely piloted aircraft system (RPAS) when nodes 102 are piloted by control station 106.

Control station 106 may provide a command and control (C2) link to nodes 102. The C2 link may generate one or more command and control (C2) signals configured to cause nodes 102 to perform various tasks, functions, operations, or maneuvers. Nodes 102 may receive the C2 signals and execute the various control commands. The control commands may cause nodes 102, such as through onboarding processing, to execute one or more actions.

For example, the one or more actions may include flight maneuvers, such as a change in altitude, a change in attitude, or orientation, with respect to one or more rotational axes, a change in heading, a change in position, follow a flight plan, a backtracking maneuver along a flight path, a homing maneuver, such as returning to control station 106, a hover-and-hold maneuver, a climb-and-hold maneuver, and the like. In some embodiments, the control commands may be associated with non-aerial platforms where nodes 102 are non-aerial platforms. The control commands also may include a deploy payload command. The deploy payload command may cause nodes 102 via onboard processing to deploy a payload. In some embodiments, nodes 102 may execute the various control commands on one or more computing systems by applications above an operating system layer.

Although system 100 is disclosed as including control station 106, the system may include alternative configurations that do not include a control station. Control station 106 may be provided solely for illustrative purposes. In some embodiments, nodes 102 may an autonomous platform. Nodes also may be based on land, water, or space as well as in the air. In this regard, one or more functions of control station 106 may be performed autonomously by one or more nodes 102.

System 100 includes server 108. Server 108 may include at least one processor 110 and a memory 112. Memory 112 includes instructions 114 that, when executed on at least one processor 110, configures server 108 to perform functions. Thus, server 108 may be configured into a special purpose device based on instructions 114. Server 108 also may include a cloud-based architecture. For example, server 108 may include a hosted server or cloud computing platform. In this regard, system 100 may include a software as a service (SaaS) configuration, in which various functions or steps of the disclosed embodiments are performed by a remote server. Server 108 may be considered a global hosted cloud.

Nodes 102, control station 106, or server 108 may be communicatively coupled by network 104. For example, nodes 102, control station 106, or server 108 may be directly coupled such that signals are transmitted directly between nodes 102, control station 106, or server 108. Alternatively, nodes 102, control station 106, or server 108 may be communicatively coupled by an indirect connection via network 104. Nodes 102, control station 106, or server 108 each may include network interface circuitry configured to interface with network 104. The network interface circuitry may include any wireline or wireless network interface circuitry.

Network 104 may allow the exchange of information and data between components of system 100. Network 104 may include a network of terrestrial communication nodes, such as communication towers, a network of mobile communication nodes, such as mobile terrestrial communication nodes or mobile airborne communication nodes, and the like. Nodes 102, control station 106, or server 108 may directly or indirectly, via network 104, communicatively coupled to one another via any communication protocols, such as Link-16, Control and Non-Payload Communications (CNPC), GSM, GPRS, CDMA, EV-DO, EDGE, WiMAX, 3G, 4G, 4G LTE, 5G, WiFi protocols, radio frequency (RF), LoRa, and the like.

For example, nodes 102, control station 106, or server 108 may transmit data between each other, directly or via network 104, utilizing the L-band or C-band. Further, nodes 102, control station 106, or server 108 may utilize signals in the range of 450 MHz to 5 GHz, or any frequency or range of frequencies known in the art. Network 104 also may include any wireline communication protocol, such as DSL-based interconnection, cable-based interconnection, and the like. Interactions between nodes 102, control station 106, or server 108 may be determined based on one or more characteristics including, but not limited to, IP addresses, MAC addresses, and the like.

System 100 also includes a cloudlet 101. Cloudlet 101 may include nodes 102. In some embodiments, cloudlet 101 may be formed dynamically. Cloudlet 101 further may be formed with any number of nodes 102. System 100 also may include a plurality of cloudlets 101. Nodes 102 in cloudlet 101 perform operations under control of control station 106. Control station 106 issues commands to control cloudlet 101 over network 104. For example, cloudlet 101 may refer to a set of UAVs and the like. Further, cloudlet 101 may include various manned assets, such as vehicles, including manned vehicles or unmanned vehicles, aircraft, such as manned aircraft or unmanned aerial systems (UAS), spacecraft, ground vehicles, ships, soldiers, military installations, and the like. Cloudlet 101 also may include various commercial drone delivery nodes and the like, and extends to commercial or business applications.

Control station 106 may allocate specific tasks to each node 102 in cloudlet 101. The number of tasks and nodes, however, may be beyond the capability of human operators in control station 106 to allocate a specific task to each node 102 in cloudlet 101. In some embodiments, control station 106 may issue a command with a high-level task. The high-level task may be within the capability of the human operator in control station 106 to allocate to cloudlet 101. The high-level task also may be referred to as a playbook command.

Figure 3A:
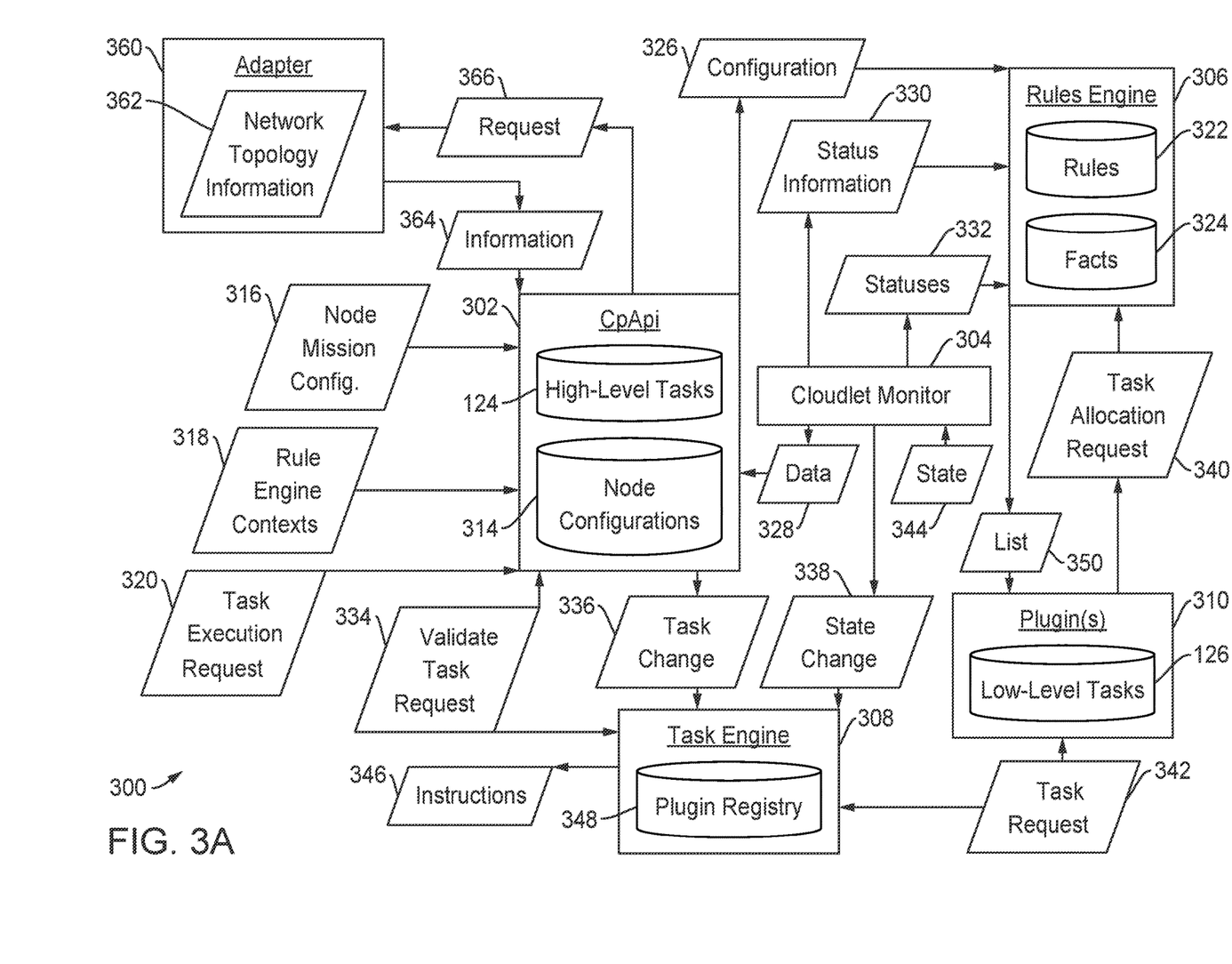
FIG. 3A illustrates a stack for use within the system according to the disclosed embodiments.

Referring to FIG. 1B, cloudlet 101 is disclosed in greater detail. Cloudlet 101 includes one or more nodes 102. Nodes 102 may include master nodes 102a and worker nodes 102b. Cloudlet 101 may include two types of computational units. Each master node 102a include a master computational unit 120. Each worker node 102b may include a worker computational unit 122. Master nodes 102a may receive a high-level task 124 from control station 106. Master nodes 102a and worker nodes 102b may be unable to directly perform high-level task 124. Instead, master nodes 102a may divide high-level task 124 into a plurality of low-level tasks 126. Master nodes 102a also delegate low-level tasks 126 to worker nodes 102b. In some embodiments, master node 102a may execute a stack 300, as disclosed in FIG. 3 below. Stack 300 may cause master nodes 102a to delegate low-level tasks 126 to worker nodes 102b. Master nodes 102a and worker nodes 102b may be any remote edge node that can compute and exchange information on cloudlet 101.

Cloudlet 101 may include at least one of master nodes 102a. For example, cloudlet 101 may include one to M of master nodes 102a, wherein M is a positive integer. Recitations of the term "master node" should be interpreted to refer to one or more of master nodes 102a or from one to M of master nodes 102a. In some embodiments, cloudlet 101 may include zero or more of worker nodes 102b. For example, cloudlet 101 may include zero to N of worker nodes 102b, wherein N is a positive integer.

Although cloudlet 101 is disclosed as including a master node 102a as executing stack 300, the disclosed embodiments are not so limited. For example, each of the nodes may be considered master nodes. Each of nodes 102 in cloudlet 101 may execute the software stack 300. Any of nodes 102 may receive a high-level task 124 and assign low-level tasks 126.

Figure 2:
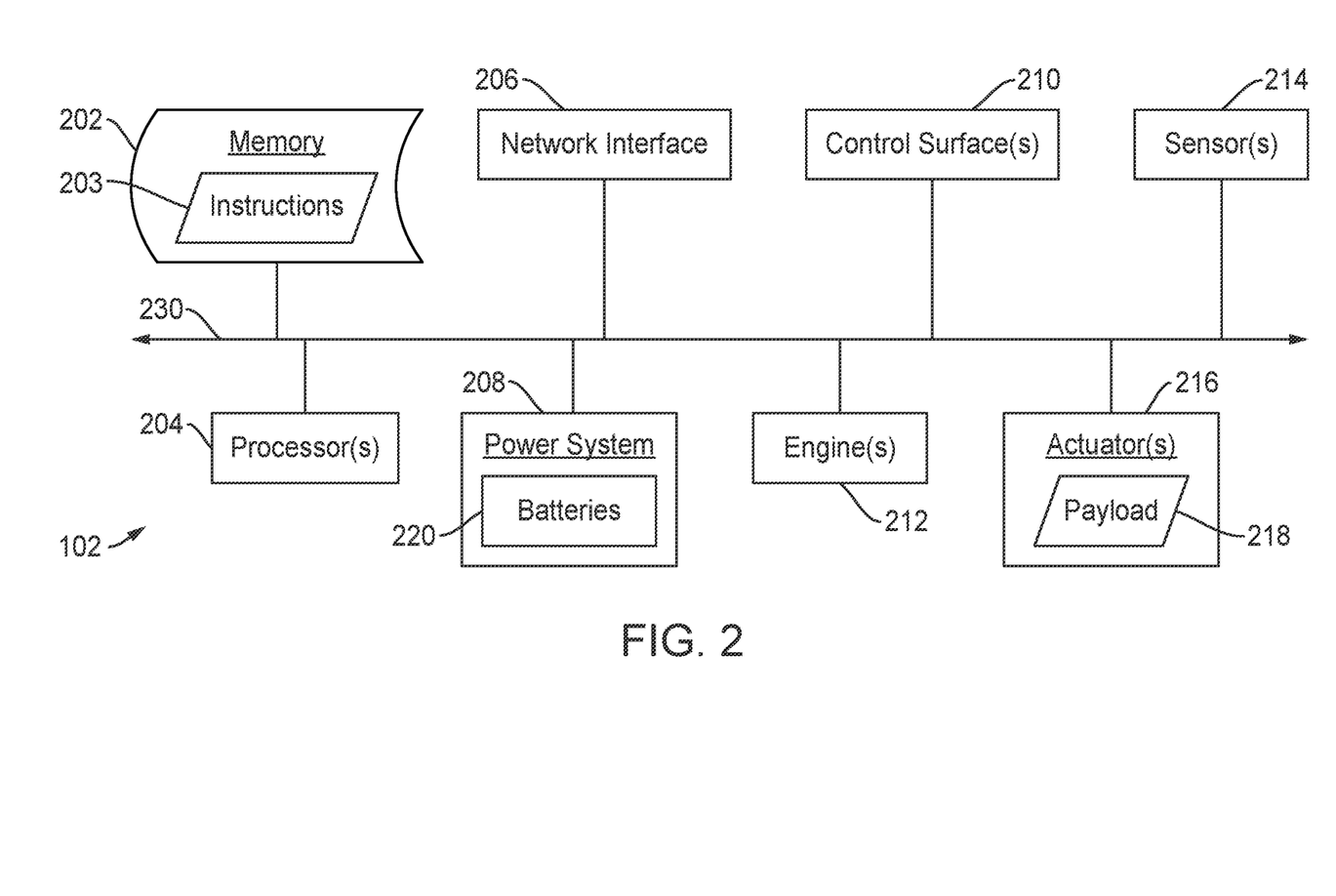
FIG. 2 illustrates a block diagram of components of a node according to the disclosed embodiments.

FIG. 2 depicts a block diagram of components of a node 102 according to the disclosed embodiments. Node 102 may be one of a master node 102a or a worker node 102b. Node 102 also may include one or more components, such as a memory 202, one or more processors 204, a network interface 206, a power system 208, control surfaces 210, engines 212, sensors 214, actuators 216, and the like. One or more of the components of node 102 may be communicatively coupled by one or more control buses 230.

Memory 202 may include a storage medium. For example, the storage medium may include a non-transitory memory medium. The non-transitory memory medium may include a read-only memory (ROM), a random-access memory (RAM), a magnetic or optical memory device, such as a disk, a solid-state drive, a flash drive, and the like. Memory 202 may be housed in a common controller housing with one or more processors 204. For example, memory 202 and a processor 204 may be housed in a processing unit, or the like. Alternatively, memory 202 may be located remotely with respect to the physical location of a processor 204. Further, memory 202 maintains program instructions 203 for configuring processor 204 to perform the various operations disclosed herein. Memory 202 also may include an operating system, program instructions, and the like, as disclosed in greater detail below. Instructions 203 are executable by one or more processors 204, thereby causing processors 204 to execute a stack 300.

One or more processors 204 may include any processing unit known in the art. For example, processors 204 may include a multi-core processor, a single-core processor, a reconfigurable logic device, such as an FPGA, a digital signal processor (DSP), a special purpose logic device, or other integrated formats. Further, embodiments may be equivalently implemented in integrated circuits, as one or more computer programs running on one or more computers, as one or more programs running on one or more processors, as firmware, or any combination thereof. The term "processor" may be defined to encompass any device having one or more processing elements that execute program instructions 203 from memory 202, from firmware, or by hardware implement functions. Processors 204 may be configured to receive control commands from control station 106, and performs high-level task 124 or one or more low-level tasks 126 in response to the control commands.

Network interface 206 may include any suitable network interface to interface with network 204, such as a wired or wireless network interface. Network interface 206 may include mechanical, electrical, or signaling circuitry for communicating data to and from network 104, and subsequently to various other nodes 102. Nodes 102 may be configured to receive various input signals and transmit various output signals from network interface 206. Network interface 206 may couple nodes 102 to network 104. Network interface 206 may wirelessly communicate with network 104, such as using one or more radio signals.

Node 102 may include a power system 208. Power system 208 may provide power to any of the various components of nodes 102. Power system 208 may include any system for providing the power, such as an electrical power system. In some embodiments, the electrical power system includes one or more batteries 220. The state of charge also may be referred to as a battery percentage. Power system 208 also may refer to a non-battery powered power system, such as a liquid fuel power system. The liquid fuel power system also may include a fuel level.

Node 102 may include control surfaces 210 or one or more engines 212. Control surfaces 210 or engines 212 may be adjusted to control the flight of node 102 according to the control commands. Control surfaces 210 may include any control surface of a fixed-wing UAV. For example, control surfaces 210 may include ailerons, elevators, rudders, spoilers, flaps, slats, air brakes, and the like. Node 102 may include control surfaces 210 or engines 212 in the contexts where node 102 is an aerial vehicle.

Node 102 also may include one or more sensors 214. Sensors 214 may include any type of sensor, such as a GNSS sensor, or GPS sensor, accelerometers, gyroscopes, magnetometers, barometers, inertial measurement units (IMUs), image sensors, RF sensors, radars, thermometers, acoustic sensors, and the like. For example, the image sensors may include an electro-optic (EO) sensor, an infrared (IR) sensor, and the like. Processors 204 may receive sensor data from sensors 214. Processors 204 may control one or more control surfaces 210 or engines 212 using one or more control loops based on the sensor data.

Node 102 may include one or more actuators 216. Actuators 216 may control or deploy a payload 218 of nodes 102. Payload 218 may include any payload suitable to be carried by UAVs, such as boxed packages, ordinance payloads, and the like. The ordinance payloads may include a type, such as bombs, missiles, rockets, and gun ammunition. Actuators 216 may include any actuator allowing node 102 to interact with the world. For example, actuators 216 may perform the actions of turning on lights, generating a jamming signal, such as a GPS or RF jamming signal, deploying a water valve, playing a sound, dropping fire retardant, deploying a net or ladder, and the like.

FIG. 3A depicts a stack 300 for use within system 100 according to the disclosed embodiments. Stack 300 also may be referred to as a cloud software stack. Stack 300 may be maintained in memory 202 of a node 102, and executable by one or more processors 204. Stack 300 provides a set of services. Each service in the set of services performs a dedicated task. The set of services communicate with each other for sharing various data. The set of services includes a command processor (Cp) application programming interface (Api), or CpApi, 302, a cloudlet monitor 304, a rule engine 306, a task engine 308, and one or more plugins 310. Stack 300 may provide a management system for remote nodes, where a control, or master, node, such as a master node 102a, delegates tasks, such as low-level tasks 126, to worker nodes 102b. The delegation rules are configurable at run-time.

Stack 300 may be a microservices architecture. The microservice architecture may refer to splitting one or more services in stack 300 into independent services that are coupled together. The microservice architecture may employ services that are independently employable. Many services within the microservice architecture are encapsulated within stack 300. The independent services may include CpApi 302, cloudlet monitor 304, rule engine 306, task engine 308, and plugins 310. The services may be coupled by an application programming interface (API). For example, the services may be coupled by a Crisp™ API or the like. The ability of the microservice architecture to parse an application into independent, loosely-coupled, individually deployable set of services allows for increased flexibility in application delivery, updating, and error correction. Although stack 300 is disclosed in the context of a microservices architecture, these embodiments are not meant to be limiting. Functions of stack 300 may be implemented in a monolithic piece of software.

In some embodiments, stack 300 is an event-drive architecture. The event-driven architecture may include detecting an event. The event may include receiving various commands from CpApi 302. The event-driven architecture may drive one or more responses in response to the command.

CpApi 302 is a gateway or entry point into stack 300. CpApi 302 accepts one or more commands. For example, control station 106 may send a command. CpApi 302 receives the command. The command received by CpApi 302 may include node mission configurations 316, rule engine contexts 318, or task execution requests 320. CpApi 302 may analyze the command and determine whether the command is valid or not valid. CpApi 302 determines whether commands are valid or not valid based on the commands having the required data. For example, CpApi 302 may accept and validate node mission configurations 316, rule engine contexts 318, or task execution requests 320.

Node mission configurations 316 may be referred to as authenticated descriptors. Node mission configurations 316 defines the capability of nodes 102. Node mission configurations 316 may be shared on initiation of a node 102 to network 104. Node mission configurations 316 may be a command to update configurations about nodes 102 in cloudlet 101. Node mission configurations 316 may include various information about nodes 102, such as a type of node 102, such an UAV, a type of sensors 214, a type of actuators 216 as well as a type of payload 218, a top speed, and the like.

Rule engine contexts 318 may include a command to update the contexts of rule engine 306. For example, the context of rule engine 306 may include task allocation. Rule engine contexts 318 also may include rules 322 of rule engine 306. In this regard, CpApi 302 may receive the command with rule engine contexts 318. CpApi 302 may provide rule engine contexts 318 to rule engine 306. Rule engine 306 may receive and maintain rule engine context 318 as rules 322.

Task execution requests 320 also are received by CpApi 302. A task execution request 320 may be a command to execute high-level tasks 124. High-level tasks 124 are not individually executable by node 102. Using CpApi 302, high-level tasks 124 may be broken into low-level tasks 126 that are individually executable by node 102. Low-level tasks 126 may be processed by plugins 310, disclosed in greater detail below. For example, a high-level task 124 may include an instruction to monitor an area. Low-level tasks 126 associated with high-level task 124 of monitoring an area may include assigning specific nodes 102 with cameras and sensors to hover within the air over the area and collect information using the cameras and sensors.

CpApi 302 may maintain high-level tasks 124 or node configurations 314. High-level tasks 124 or node configurations 314 may be maintained in memory 202. CpApi 302 may maintain high-level tasks 124 based on task execution requests 320. High-level tasks 124 may include a status of the task or a state of the task. CpApi 302 may detect a new high-level task 124 has been received in task execution request 320 and sends a task change 336 to task engine 308.

CpApi 302 may maintain node configurations 314. Node configurations 314 may include node mission configurations 316 received from network 104. CpApi 302 may detect a change in node configurations 314 and sends configuration 326 to rule engine 306. In some embodiments, CpApi 302 may provide configuration 326 to rule engine 306. Configuration 326 may include node configurations 314 of nodes 102 in cloudlet 101.

Cloudlet monitor 304 is provided. Cloudlet monitor 304 may be considered an edge telemetry layer to gather dynamic status information of nodes 102. Cloudlet monitor 304 monitors status information of nodes 102 in cloudlet 101, such as the number of nodes, the status of the nodes, CPU load, location, current tasks, and the like. Cloudlet monitor 304 may receive and monitor state 344 of cloudlet 101. State 344 of cloudlet 101 may include real-time data regarding the status of cloudlet 101. State 344 of cloudlet 101 may refer to status information about nodes 102 in cloudlet 101. To this end, cloudlet monitor 304 monitors information about nodes 102, such as a network condition, or a communication status available, bandwidth, and the like, a location of nodes 102, a heading of nodes, loads, or processor loads, memory loads, and the like, remaining payload, fuel remaining, a state of charge of a battery, and the like. State 344 may refer to a dynamic node status. The dynamic node status is determined by periodic node telemetry.

Cloudlet monitor 304 may receive state 344 of cloudlet 101 from nodes 102. Individual nodes 102 share state 344 to allow stack 300 to make low-level task 126 allocation decisions. In some embodiments, nodes 102 may implement a gossip protocol to share state 344 of cloudlet 101 between nodes 102. The gossip protocol may disseminate state 344 between nodes 102. It also may indicate that the nodes do not directly request for data between nodes 102. Instead, each node 102 generates state 344 and automatically sends the data for state 344 to surrounding nodes 102. Surrounding nodes 102 receive state 344 and relays state 344 to other nodes in cloudlet 101. State 344 is then disseminated between nodes 102.

Cloudlet monitor 304 may cause nodes 102 to transmit or receive state 344. Cloudlet monitor 304 may transmit and receive via network interface 206. Cloudlet monitor 304 may cause nodes 102 to transmit state 344 in response to generating state 344 about itself or to relay state 344 from another node. Cloudlet monitor 304 also may cause node 102 to receive state 344 from another node 102.

Cloudlet monitor 304 may provide status information 330 of worker nodes 102b to rule engine 306. Rule engine 306 may receive and maintain status information 330 as faces 324. Cloudlet monitor 304 may monitor cloudlet 101 for changes to nodes 102. Cloudlet monitor 304 detect changes in cloudlet 101 or nodes 102. Cloudlet monitor 304 then may provide updated statuses 332 to rule engine 306. Rule engine 306 may receive and maintain status information 330 as facts 324. Facts 324 may be considered real-time facts as they are updated in response to receiving updated statuses 332. Facts 324 also may refer to configured contexts. In some embodiment, cloudlet monitor 304 may provide data 328 to CpApi 302. Data 328 may include data or information regarding the status of cloudlet 101.

Rule engine 306 also is provided within stack 300. Rule engine 306 may decide what rules 322 should be applied in a situation. Rule engine 306 may receive and maintain rules 322 and facts 324. Rule engine 306 may apply rules 322 to facts 324 deterministically. Rule engine 306 deterministically produces the allocation of nodes 102 to low-level tasks 126 based on rules 322 and facts 324. Rule engine 306 finds solutions to constraint networks based on formally expressed rules.

Rule engine 306 is deterministic and executes discrete logic with complete precision. Rule engine 306 relies on knowledge expressed in the form of rules 322. The deterministic property allows for high-assurance, mission-critical command and control, certification, and the like. Rule engine 306 may support formal proofs of correct behavior. Rule engine 306 is generic to each of plugins 310. For example, each plugin 310 uses and reuses rule engine 306.

The capabilities of worker nodes 102b may be maintained as facts 324. A capability may be based on node configuration 316 or state 344 of nodes 102. Rule engine 306 may perform a binary determination or a scalar determination. For example, the binary determination may be based on a sensor type of nodes 102. In another example, the scalar determination may be based on a distance from nodes 102 to a target. Various other binary and scalar determinations may be performed.

Rule engine 306 may generate a list 350 of one or more worker nodes 102b for each low-level task 126. Rule engine 306 generates list 350 to match the requirements of low-level tasks 126. Rule engine 306 also may generate list 350 based on facts 324 and rules 322. List 350 may be ranked or prioritized. The ranking of list 350 may recommend the best nodes based on the requirements. The plurality of low-level tasks 126 are individually executable by worker nodes 102b in list 350. Rule engine 306 may return list 350 to plugins 310.

Rule engine 306 allows programmatic allocation of low-level tasks 126 to one or more nodes 102. The programmatic allocation is matched to the capability of the platform for one or more nodes 102, such as aircraft type, sensor capabilities, munition type, top speed, turn rate, and the like. The programmatic allocation also is matched to the current status of the platform for one or more nodes 102, such health, position, fuel remaining, computational load, network condition, presence of other nodes, or hostile or enemy nodes, remaining munitions, and the like.

In some embodiments, the programmatic allocation is matched to both the static and dynamic properties of one or more nodes 102. The status properties of nodes 102 may refer to the capability of the platform of nodes 102, such as aircraft type, sensor capabilities, munition type, top speed, turn rate, and the like. The dynamic properties of nodes 102 may refer to the current status of the platform of nodes 102, such as health, position, fuel remaining, computational load, network condition, the presence of other nodes, or they hostile or enemy, remaining munitions, and the like.

In some embodiments, rule engine 306 may include an expert system. The expert system defines prerequisite logic for executing specific tasks. The expert language defines rules 322 and fact 324. The expert system may be a computer process that applies rules 322 to facts 324. Rule engine 306 matches requirements of low-level tasks 126 to worker nodes 102b using the expert system. The expert system may be deterministic. The deterministic property of the expert system indicates that the expert system will always produce the same output provided the same initial input. Rule engine 306 may be a passive service. The expert system may allow stack 300 to automatically match low-level tasks 126 to nodes 102 based on complex criteria. The expert system may be implemented in one or more computer programming languages.

Rules 322 are logical statements or logical expressions. Rule engine 306 uses rules 322 is performing operations. Rules 322 may be maintained in a human-readable format. For example, rules 322 may be maintained in JavaScript Object Notation (JSON). Rules 322 may be updated at run-time. In some embodiments, rules 322 for a given application may be customized, without modification to rule engine 306 itself. Rule engine 306 may receive rule engine context 318 and maintain the rule engine context as rules 322. A change to rules 322, such as via rule engine contexts 318, may cause cloudlet 101 and nodes 102 to behave differently. Rules 322 are fully customizable for different missions. Rules 322 may be defined dynamically. Rules 322 may be dynamically updated during a mission. Rules 322 may be changed by redeploying stack 300.

Rules 322 may include if-then statements, decision tables, and the like. For example, rules 322 may be defined based on a proximity to an area. If nodes 102 are within a range to the area, then nodes 102 are eligible to be delegated low-level tasks 126. Rules 322 also may be defined based on a type of sensor 214. If nodes 102 include an image sensor, then nodes 102 are eligible to be delegated low-level tasks 126 from a surveillance plugin. Rules 322 may be defined based on the network status. If nodes 102 are available for communication, then nodes 102 are eligible to be delegated low-level tasks 126. For instance, rules 322 may define a minimum network condition of node 102 on network 104. Rules 322 dictate if the network condition of a node 102 degrades below the minimum network condition, then low-level task 126 is reallocated to another node.

Facts 324 may include static facts regarding node mission configuration 316 of nodes 102 in cloudlet 101. Rule engine 306 is configured to receive and maintain node mission configuration 316 as facts 324. Node mission configuration 316 may include the static facts. Facts 324 also may include dynamic facts regarding current state 344 of a node 102 in cloudlet 101. Rule engine 306 is configured to receive and maintain state 344 as facts 324. In some embodiments, rule engine 306 knows the position of nodes 102, memory allocations, and the like of nodes 102 in cloudlet 101.

Task engine 308 also is provided. Task engine 308 is a framework that allows plugins to be loaded. Task engine 308 receives high-level task 124 from CpApi 302. Task engine 308 receives high-level task 124 from CpApi 302 in a task changed 336 notification. Task engine 308 receives and possesses high-level task 124. Task engine 312 delegates high-level task 124 to one plugin of plugins 310. Task engine 308 includes a plugin registry 348 of each of plugins 310. Task engine 308 may look up plugins 310 in plugin registry 348.

Task engine 308 may follow a behavior. The behavior of task engine 308 is hard-coded. Task engine 308 decides what to do with high-level task 124 given the behavior. For example, task engine 308 may know the task received from CpApi 302 in task changed 336 notification is a high-level task 124. The behavior also may cause task engine 308 to delegate high-level task 124 to a single plugin 310. Task engine 308 may delegate high-level task 124 to the plugin in a process task request 342. Task engine 308 also may receive allocations of low-level tasks 126 to allocated worker nodes 102b from plugins 310 in a response to process task request 342. Task engine 308 then may transmit one or more instructions 346 of low-level tasks 126 to the allocated worker nodes.

Task engine 308 also may control and monitor high-level tasks 124 or low-level tasks 126. For example, task engine 308 may control and monitor low-level tasks 126 that are performed or executed by nodes 102 to which are allocated low-level tasks 126. Task engine 308 may detect that plugins 310 did not assign low-level tasks 126, such that high-level task 124 has failed. Task engine 308 may reload plugins 310 in response to detecting the failure. Task engine 308 also may receive a validate task request 334 from CpApi 302. Task engine 308 responds to validate task request 334 by validating high-level task 124.

Task engine 308 monitors the state of cloudlet 101. For example, task engine 308 may receive a notification of a state change 338 from cloudlet monitor 304. State change 338 may indicate cloudlet 101 is online, offline, and the like. A notification of state change 338 also may indicate the states of nodes 102 in cloudlet 101.

Plugins 310 are provided. Plugins 310 also may be referred to as task engine plugins. Plugins 310 are components that add specific features to task engine 308. Plugins 310 receive high-level task 124. For example, plugins 310 may receive high-level task 124 as a link within process task request 342. Plugins 310 divide high-level task 124 into low-level tasks 126. Plugins 310 may perform these operations to create low-level tasks 126 by one or more rules maintained in plugins 310. Task engine 308 does not perform individual tasks for nodes 102, such as navigation, surveillance, location, and the like. Instead, task engine 308 delegates tasks to plugins 310. The individual tasks for nodes 102 then are performed by plugins 310. The functionality of plugins 310 may be modified without changing task engine 308.

Plugins 310 execute operations as a set of low-level tasks 126 allocated to worker nodes 102b. Plugins 310 may allocate low-level tasks 126 to worker nodes 102b based on the capability of each worker node 102b. Plugins 310 decide how to allocate by asking rule engine 306. Plugins 310 may send a task allocation request 340 to rule engine 306. Task allocation request 340 may include the requirements of low-level tasks 126. For example, plugins 310 may ask rule engine 306 if given these facts, then what is the instruction or operation applicable to the facts.

Plugins 310 may receive list 350 from rule engine 306. Plugins 310 may assign low-level tasks 126 to allocated worker nodes in list 350 of the one or more worker nodes for each low-level task 126. Plugins 310 relays the delegation to task engine 308 in process task request 342. Task engine 308 then assigns nodes 102 to low-level tasks 126 according to the delegation. Thus, stack 300 may assign low-level tasks 126 to nodes 102 automatically or without having human intervention to manually assign low-level tasks 126 to individual nodes. Plugins 310 also may process task redistribution requests. Task redistribution requests may refer to redistributing the allocation of low-level tasks 126 to nodes 102. A task redistribution request may allow re-tasking for resiliency. In some embodiments, plugins 310 may process task reinforcement requests.

Plugins 310 may be mission-specific plugins. Plugins 310 implement or execute a specific task. Plugins 310 may implement different tasks. Plugins 310 may include plugins for a different type of tasks and different operations of nodes 102. For example, plugins 310 may include a surveillance plugin, a detect, identify, locate, and report plugin, flight control plugins, payload plugins, and the like.

Plugins 310 may access one or more devices of nodes 102, such as cameras, flight systems, gyroscopes, actuators, sensors, Lidar, red-green-blue cameras, heat-thermal cameras, and the like. The flight plugins may control one or more control surfaces 210 or engines 212 of nodes 102. The flight plugins also may actuate control surfaces 210 or engines 212 to control flight of a node 102. The flight plugins may control the flight of a node 102 within one or more operational parameters.

For example, the operational parameters may include altitudes, such as maximum altitude or minimum altitude, position, such as latitude coordinates or longitude coordinates, speed, such as minimum speed or maximum speed, G-forces, such as maximum G-force, maneuvers, and the like. The surveillance plugins or location plugins may control one or more sensors 214 of a node 102. For example, the surveillance or location plugins may control image sensors of a node 102. The payload plugins may control one or more actuators 216 of a node 102. Payload applications may actuate actuators 216 to deploy payloads 218 of a node 102.

Although plugins 310 are disclosed in the context of a node 102 that is an aerial vehicle, nodes 102 are not limited thereto. Plugins 310 may be applied across a variety of node types. Plugins 310 may be any edge processing function that can be programmatically delegated to a selection of edge worker nodes.

In some embodiments, stack 300 is extensible. Stack 300 may be extensible to allow the introduction of new types of tasks. The new types of tasks may utilize new or updated copies of plugins 310. Further, task engine 308 may register the new or updated copies of plugins 310 in plugin registry 348. Plugins 310 may be updated or changed by registering in plugin registry 348 for task engine 308.

Stack 300 also includes network adapter 360. Network adapter 360 communicates to other components within stack 300 via CpApi 302. Network adapter 360 acts as a bridge or connection between stack 300 through CpApi 302 and external devices, systems, and the like within system 100 or one or more cloudlets 101. It may pull information from network 104. This information may be pulled into network adapter 360 periodically, such as every second or less.

Network adapter 360 may pull network topology information 362 and pushes the network topology information to features within stack 300, such rule engine 306. For example, rule engine 306 may send a request 366 to network adapter 360 to push the latest version of network topology information 362 provided by network 104. Network adapter 360 responds with information 364 on the network as compiled by the network adapter. Rule engine 306 uses network topology information 362 when applying rules 322 to generate list 350.

For example, network topology information 362 includes information about the distance between nodes 102 within cloudlet 101. For example, node A may be at a further distance from stack 300 than node B. Rules 322 may include a rule to select the closest node to complete a task based on the updated distances for the nodes within network topology information 362. Thus, rule engine 306 will select node B for list 350 to complete the task over node A based on the applicable rule and the updated network topology information provided by network adapter 360.

This feature optimizes the allocation of tasks to nodes that best meet the requirements set forth by rules 322 as informed by network topology information 362. Network topology information 362 allows rule engine 306 to perform programmatic assignment of tasks to nodes or edge assets based on current radio health and network information that is current. Stack 300 may match mission tasks to nodes 102 based on complex criteria as rules 322 may take into account the changing topology information collected by network adapter 360. Further, rules 322 may be updated or customizable when taking into account network topology information 362.

Task engine 308, as disclosed above, may request that rule engine 306 allocate tasks according to rules 322 and facts 324. Task engine 308, therefore, will allocate tasks to nodes 102 according to network topology information 362. Task engine 308 may not directly access network adapter 360 for this information but will perform actions based on instructions provided by rule engine 306, which do take into account network topology information 362.

Figure 3B:
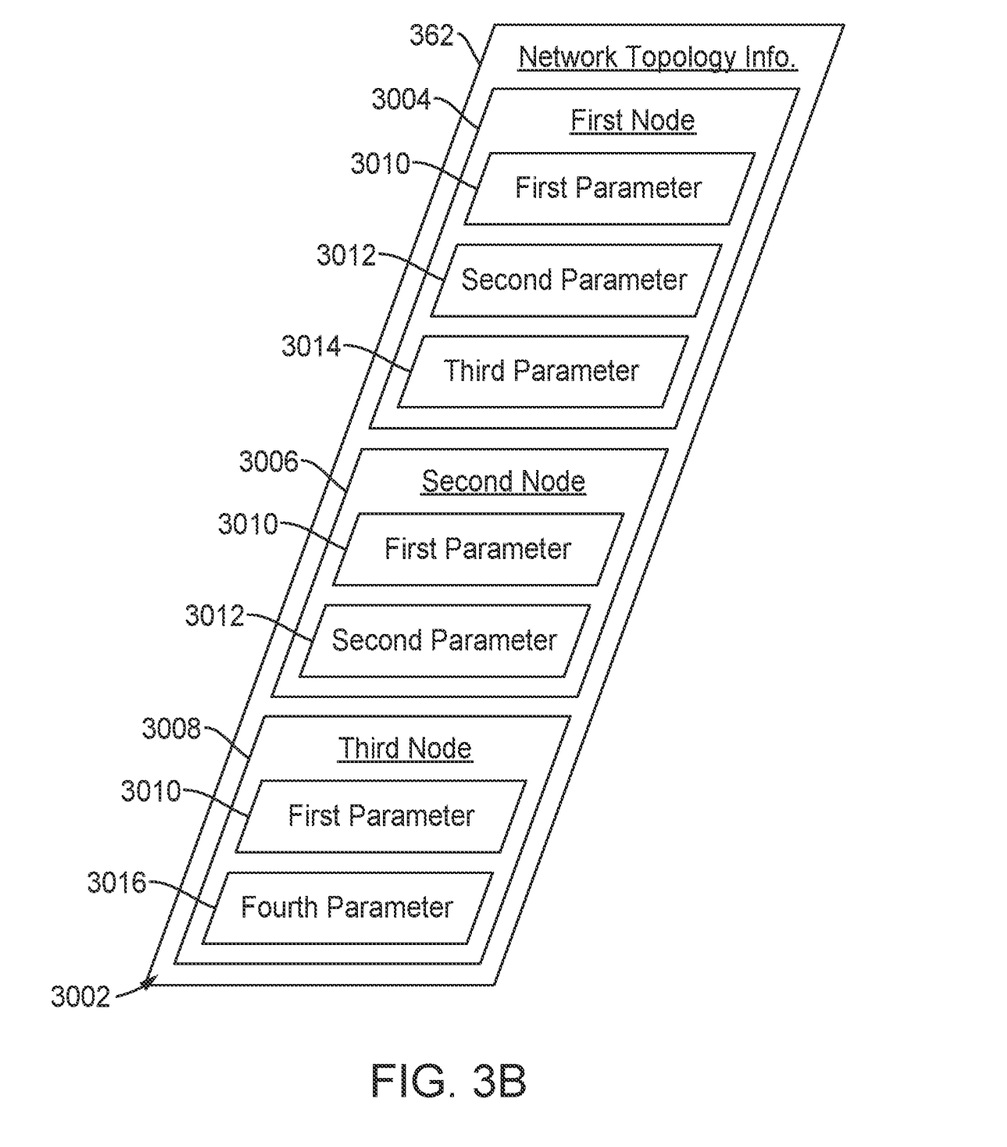
FIG. 3B illustrates a block diagram of a data structure for network topology information according to the disclosed embodiments.

FIG. 3B depicts a block diagram of a data structure 3002 for network topology information 362 according to the disclosed embodiments. Data structure 3002 is an example of potential data stored within network topology information 362 for use by rule engine 302 when generating list 350 to perform high-level tasks 124 as low-level tasks 126. Additional data may be included. Further, network topology information 362 is not limited to the embodiments disclosed by FIG. 3B.

Network adapter 360 pulls network topology information 362 constantly from network 104 or system 100. The different network adapters on the different nodes may be updated with current network topology information. The information may include various conditions, or parameters, for the network components, such as nodes 102. Thus, data structure 3002 includes first node information 3004, second node information 3006, and third node information 3008. As can be appreciated, network topology information 362 may include entries for many more nodes than this.

Under first node information 3004, information for a first parameter 3010, a second parameter 3012, and a third parameter 3014 may be provided. Parameters may relate to the condition or health of the node in a quantifiable manner. For example, first parameter 3010 may be a distance from stack 300 hosting network adapter 360. Second parameter 3012 may be the current load for the node associated with first node information 3004. Third parameter 3014 may be the current link throughput to the node associated with first node information 3004. These parameters may include values within data structure 3002. These values may be used by rule engine 302 in allocating tasks to nodes.

Second node information 3006 and third node information 3008 may be structured similarly but with some differences. For example, second node information 3006 may include first parameter 3010 and second parameter 3012. The values for these parameters should differ from the values for the respective parameters under first node information 3004. Second node information 3006 may not include third parameter 3014 as a value for this parameter may not be available.

Third node information 3008 may include first parameter 3010 and fourth parameter 3016. Thus, the node corresponding to third node information 3008 may include a feature, plugin 310, or other aspect that is reflected in fourth parameter. In some embodiments, the nodes associated with first node information 3004 and second node information 3006 do not have the feature, plugin 310, or aspect that is available on this respective node. For example, fourth parameter 3016 may be battery life for a special camera mounted on the node associated with third node information 3008.

As can be appreciated, data structure 3002 may include any number of parameters that are retrieved from the various nodes. Although first, second, third, and fourth parameters are shown, the disclosed data structure may include several, if not more, parameters. Further, parameters are not limited to node information. Parameters may be retrieved for control station 106 and server 108. Parameters also may be retrieved for network 104 itself.

Rule engine 306 may take into account the parameters for node information entries within data structure 3002. For example, rules 322 may include one to select the closest node within network 104. As nodes 102 may be mobile platforms, they change their distance from stack 300 continuously or periodically. Network adapter 360 pulls the distance information for first parameter 3010 for each node 102 accessible by stack 300. It provides this information to rule engine 306 via CpApi 302.

Rules 322 also may include a rule instructing to use only nodes having less than a 50% load, as detailed by second parameter 3012. Further, rules 322 may be configured that this rule overrides the rule using first parameter 3010, or the distance from stack 300. Thus, if the node associate with second node information 3006 includes a second parameter of 30% load and a distance of 30 meters, then rule engine 306 may allocate a task within list 350 to that node over the node associated with first node information 3004 having a first parameter of 60% and a distance of 40 meters. Again, the loads and distances change with time so that network topology information 362 is updated by network adapter 360. These changes allow rule engine 306 to act in a dynamic manner when allocating tasks.

Parameters within network topology information 362 also may include connectivity of respective worker node 102b to master node 102a, if master node 102a include stack 300. They also may include availability of respective worker node 102b within network 104. For example, if a worker node 102b is not available according to network topology information 362, then rules 322 may indicate that node is not be allocated any tasks. Parameters also may include a priority of the respective node within network 104. For example, a parameter under first node information 3004 may indicate that the respective node has priority for certain tasks, such as surveillance or image capturing. Thus, rules 322 will review this parameter and act accordingly.

Figure 4:
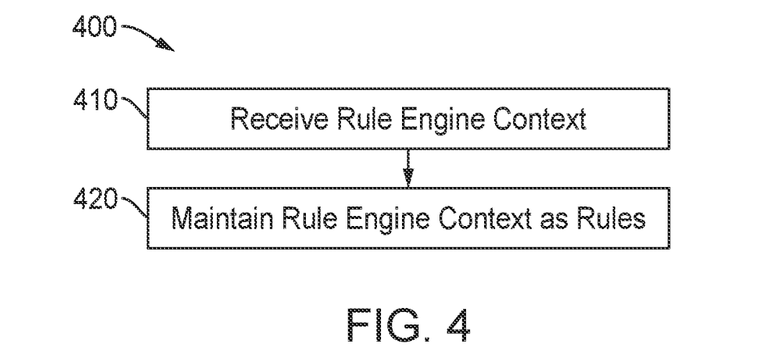
FIG. 4 illustrates a flowchart for maintaining rules in a rule engine according to the disclosed embodiments.

FIG. 4 depicts a flowchart 400 for maintaining rules 322 in rule engine 306 according to the disclosed embodiments. Flowchart 400 may refer to FIGS. 1-3B for illustrative purposes. Flowchart 400, however, is not limited to the embodiments disclosed by FIGS. 1-3B. Flowchart 400 also may be understood with reference to stack 300. For example, flowchart 400 may be one workflow in stack 300.

Step 410 executes by receiving rule engine context 318. CpApi 302 may receive rule engine context 318 using network interface 206 from control station 106 view network 104. Step 420 executes by maintaining rule engine context 318 as rules 322 within rule engine 306. Rule engine 306 receives rule engine context 318. It may do so via configuration 326 from CpApi 302 to rule engine 306.

Step 410 and 420 may be performed during initialization of rule engine 306. Steps 410 and 420 then may be iteratively repeated to update rules 322. Additional rule engine 318 may be received by CpApi 302. CpApi 302 may validate additional rule engine context 318 and send additional configuration 326 to rule engine 306. Rule engine 306 received additional rule engine context 318 and maintains additional rule engine contexts 318 as additional rules 322.

In some embodiments, rule engine contexts 318 may include information related to network topology information in that rules 322 are configured to take into account this information when allocating tasks or generating list 350. Additional rule engine contexts 318 also may be received as changes are made within network 104, such as the additional or removal of one or more nodes 102.

Figure 5:
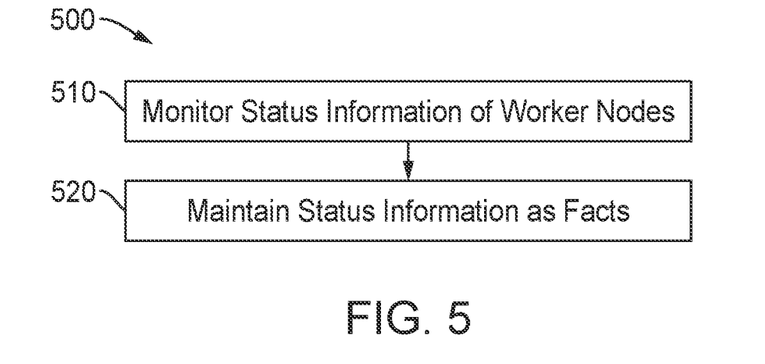
FIG. 5 illustrates a flowchart for maintaining facts in the rule engine according to the disclosed embodiments.

FIG. 5 depicts a flowchart 500 for maintaining facts 324 in rule engine 306 according to the disclosed embodiments. Flowchart 500 may refer to FIGS. 1-4 for illustrative purposes. Flowchart 500, however, is not limited to the embodiments disclosed by FIGS. 1-4. Flowchart 500 also may be understood with reference to stack 300. For example, flowchart 500 may be a second workflow in stack 300.

Step 510 executes by monitoring status information of worker nodes 102b. Cloudlet monitor 304 receives state 344 from worker nodes 102b. Each node 102b inside cloudlet 101 gets states 344 from the other nodes in the cloudlet. Cloudlet monitor 304 receives state 344 from worker nodes 344 via network interface 206. Cloudlet monitor 304 then monitors the status information of worker nodes 102b based on state 344.

Step 520 executes by maintaining the status information as facts 324 in rule engine 306. Rule engine 306 may receive status information 330 of worker nodes 102b. Cloudlet monitor 304 also may detect changes in cloudlet 101 or nodes 102. Cloudlet monitor 304 then may provide updated statuses 332 to rule engine 306. Rule engine 306 maintains a real-time list of facts 324 regarding nodes 102.

Figure 6:
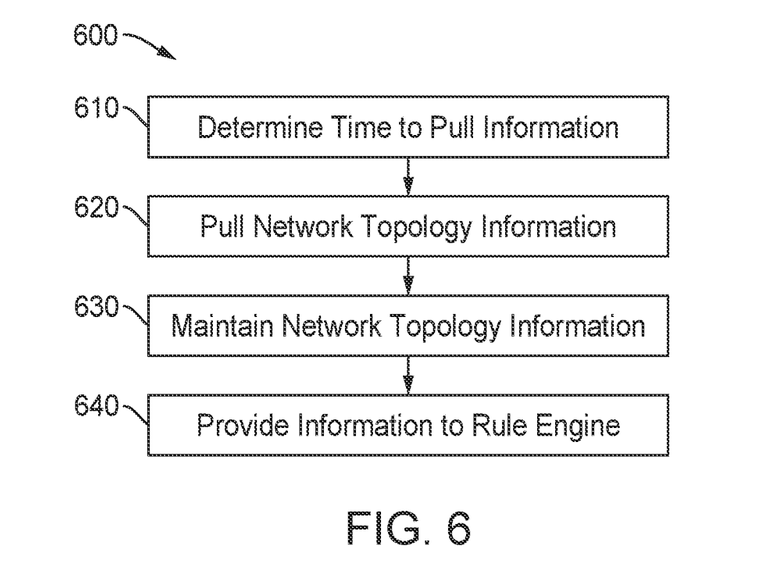
FIG. 6 illustrates a flowchart for maintaining network topology information at a stack according to the disclosed embodiments.

FIG. 6 depicts a flowchart 600 for maintaining network topology information 362 at stack 300 according to the disclosed embodiments. Flowchart 600 may refer to FIGS. 1-5 for illustrative purposes. Flowchart 600, however, is not limited to the embodiments disclosed by FIGS. 1-5. Flowchart 600 may be understood with reference to stack 300 and network adapter 360. For example, flowchart 300 may be a third workflow in stack 300.

Step 610 executes by determining that it is time to pull network topology information 362 from network 104. For example, network adapter 260 may use network interface 206 to pull information for nodes 102 from network 104. Network topology information 362 may be pulled from the nodes themselves over network 104. Alternatively, it may be pulled from control station 106 or server 108. Network adapter 360 also may pull network topology information 362 when requested by stack 300. For example, rule engine 306 may desire the most current information so sends a request 366 to network adapter 360.

Step 620 executes by pulling network topology information 362 from network 104 by network adapter 360. Step 630 executes by maintaining network topology information 362 at network adapter 360. Network adapter 360 is configured to maintain the data within network topology information 362. It also may update the information as needed by repeating step 610, disclosed above. Step 640 executes by providing network topology information 362 to rule engine 306 when requested in order to allocate low-level tasks 126 in list 350. Rule engine 306 may need the latest information about network 104 and system 100 in making determinations using rules 322 and facts 324.

Figure 7:
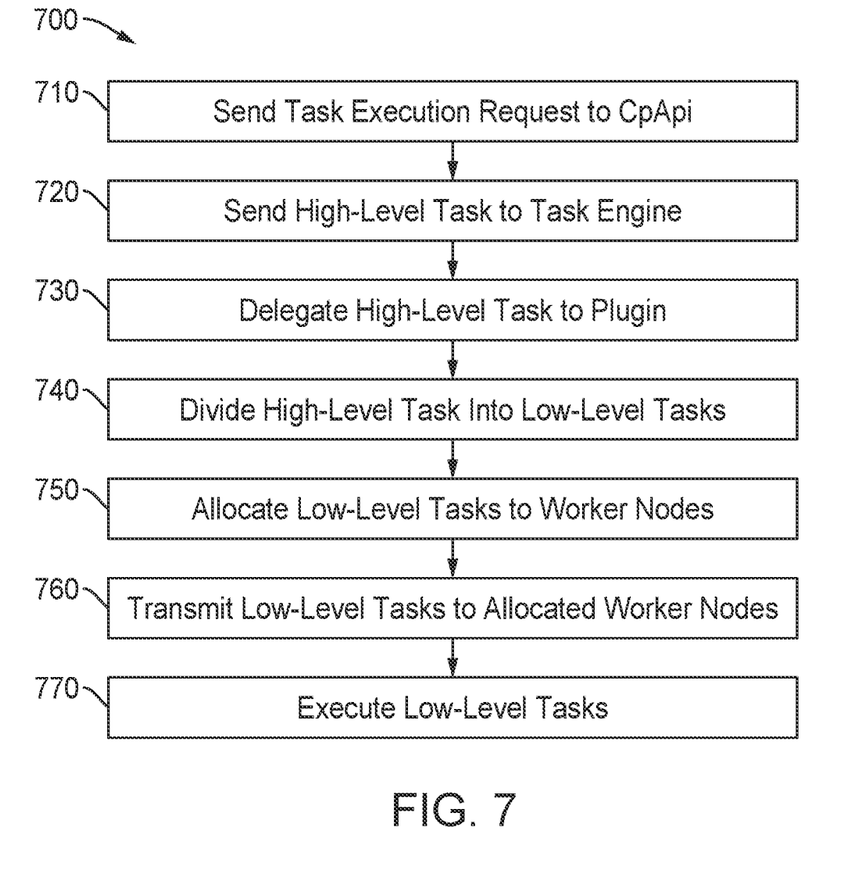
FIG. 7 illustrates a flowchart for assigning or allocating low-level tasks according to the disclosed embodiments.

FIG. 7 depicts a flowchart 700 for assigning or allocating low-level tasks 126 according to the disclosed embodiments. Flowchart 700 may refer to FIGS. 1-6 for illustrative purposes. Flowchart 700, however, is not limited to the embodiments disclosed by FIGS. 1-6. Flowchart 700 may disclose assigning or allocating low-level tasks 126 in response to receiving high-level tasks 124. Flowchart 700 also may refer to stack 300. For example, flowchart 700 may be a fourth workflow in stack 300.

Step 710 executes by sending task execution request 320 to CpApi 302. Task execution request 320 may be send to CpApi 302 from control station 306 over network 104. Task execution request 320 may be send to a master node 102a of nodes 102. CpApi 302 receives task execution request 320 via network interface 206. CpApi 302 validates task execution request 320. Task execution request 320 include high-level task 124 that is not individually executable by a node 102, such as master node 102a or one of worker nodes 102b.

Step 720 executes by sending high-level task 124 to task engine 308. High-level task 124 may be sent to task engine 308 by CpApi 302. Step 730 executes by delegating high-level task 124 to a plugin 310. Task engine 308 delegates high-level task 124 to a plugin based on the type of high-level task 124. Task engine 308 may check with plugin registry 348 to ensure a plugin 310 is available to complete high-level task 124. For example, high-level task 124 may be surveillance of an area and a plugin 310 is registered with task engine 308 to complete surveillance. Task engine 308 may delegate high-level task 124 to plugin 310 in process task 342.

Step 740 executes by dividing high-level task 124 into low-level tasks 126 by plugin 310, as delegated above. Plugin 310 divides high-level task 124 into low-level tasks 126 based on rules maintained in plugins 310. For example, the plugin may include surveillance rules for dividing the high-level surveillance task into low-level surveillance tasks. In another example, the plugin may include locate rules for dividing a high-level location task into low-level location tasks. Low-level tasks 126 are subtasks of high-level task 124.

Step 750 executes by allocating low-level tasks 126 to worker nodes 102b. Low-level tasks 126 are assigned based on facts 324 and rules 322 in rule engine 306. The plugin asks rule engine 306 to return a set of worker nodes 102b that are available to execute each of low-level tasks 352. The plugin asks rule engine 306 in task allocation request 340. Rule engine 306 evaluates the requirements in task allocation request 340. For example, rule engine 306 may consider the availability of the nodes, the load of the nodes, and the like from network topology information 362. Rule engine 306 pulls network topology information 362 from network adapter 360. Rule engine 306 returns list 350 of worker nodes 102b that are available to execute each of low-level tasks 126 in accordance with network topology information 362 to the plugin. The plugin of plugins 310 receives list 350 of nodes that meet the requirements and assigns low-level tasks to allocated nodes within the list. Low-level tasks 126 are individually executable by worker nodes 102b, or the allocated nodes received from rule engine 306. Plugin 310 may relay the allocation of low-level tasks 126 with the allocated nodes to task engine 308. Process task 342 may be used to relay the allocation to task engine 308.

Step 760 executes by transmitting low-level tasks 126 to allocated worker nodes 102b from task engine 308. Task engine 308 may cause network interface 206 to transmit low-level tasks 126 to worker nodes 102b over network 104. Task engine 308 may transmit low-level tasks 126 using appropriate protocols to exchange data over network 104.

Step 770 executes by executing low-level tasks 126 as allocated to worker nodes 102b. The allocated worker nodes receive low-level tasks 126 over network 104. They may receive the low-level tasks from master node 102a or control station 106. The allocated nodes may include plugins 310 for executing the assigned low-level tasks. For example, plugins 310 may cause the allocated nodes to fly to a location using control surfaces 210 and engines 212. In another example, plugins 310 may cause the allocated nodes to perform surveillance at the location using sensors 214.

Network topology information 362 may be used in assigning worker nodes to complete these tasks. Further, updates to network topology information 362 may cause a change in list 350 of allocated worker nodes 102b based on a parameters detected within the nodes in network 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

The invention claimed is:
1. A method comprising:
  receiving a high-level task to be completed by a plurality of nodes configured in a network, wherein the plurality of nodes includes a master node and a plurality of worker nodes;

receiving the high-level task at a task engine of the master node, wherein the task engine delegates the high-level task to a plugin of a plurality of plugins at the master node;

dividing the high-level task into a plurality of low-level tasks using the plugin to divide the high-level task;

retrieving network topology information corresponding to the network of the plurality of nodes;

generating a list of at least one worker node of the plurality of worker nodes for each of the plurality of low-level tasks based on a plurality of facts and a plurality of rules regarding the network using a rule engine, wherein the plurality of low-level tasks is individually executable by the at least one worker node; and assigning each of the plurality of low-level tasks to an allocated at least one worker node of the list according to the network topology information using a task engine by determining an availability of the allocated at least one worker node to be assigned a low-level task using the network topology information and assigning the allocated at least one worker node based on the availability, wherein the allocated at least one worker node includes a feature selected by the rule engine within the network topology information, and wherein the rule engine is an expert system including the plurality of rules, the plurality of facts, and the network topology information and wherein the expert system is deterministic.

2. The method of claim 1, wherein retrieving network topology information is pulled by a network adapter from the network of the plurality of nodes.

3. The method of claim 1, further comprising requesting a parameter from each of the plurality of worker nodes from the master node.

4. The method of claim 3, wherein the parameter includes at least one of connectivity of the respective worker node to the master node, availability of the respective node within the network, and priority of the respective node within the network.

5. The method of claim 3, wherein the parameter includes a distance of the respective node from a stack having the rule engine and the task engine.

6. The method of claim 1, further comprising monitoring status information of the plurality of worker nodes using a cloudlet monitor.

7. The method of claim 6, further comprising receiving a node mission configuration of the plurality of worker nodes and the status information at the rule engine; and maintaining the node mission configuration and the status information of the plurality of facts at the rule engine.

8. The method of claim 7, further comprising detecting a change in the status information at the cloudlet monitor; and updating the plurality of facts by the rule engine with the change in the status information.

9. The method of claim 1, further comprising receiving a rule engine context at the rule engine; and maintaining the rule engine context at the rule engine as the plurality of rules.

10. The method of claim 1, wherein the network topology information includes information about a component on the at least one worker node.

11. A master node within a network, the master node comprising:

at least one processor;

a memory storing instructions, wherein the instructions, when executed on the at least one processor, configure the at least one processor to receive a high-level task to be completed by a plurality of worker nodes controlled by the master node;

receive the high-level task at a task engine of the master node, wherein the task engine delegates the high-level task to a plugin of a plurality of plugins at the master node;

divide the high-level task into a plurality of low-level tasks using the plugin of the plurality of plugins;

retrieve network topology information corresponding to the network of the plurality of worker nodes;

generate a list of at least one worker node of the plurality of worker nodes for each of the plurality of low-level tasks based on a plurality of facts and a plurality of rules regarding the network using a rule engine, wherein the plurality of low-level tasks is individually executable by the at least one worker node; and assign each of the plurality of low-level tasks to an allocated at least one worker node of the list according to the network topology information using a task engine to determine an availability of the allocated at least one worker node to be assigned a low-level task using the network topology information and to assign the allocated at least one worker node based on the availability, wherein the allocated at least one worker node includes a feature selected by the rule engine within the network topology information, and wherein the rule engine is an expert system including the plurality of rules, the plurality of facts, and the network topology information and wherein the expert system is deterministic.

12. The master node of claim 11, further comprising a task engine, wherein the task engine receives the high-level task and delegates the high-level task to the plugin.

13. The master node of claim 11, further comprising a cloudlet monitor to monitor status information of the plurality of worker nodes and report the status information to the rule engine.

14. A system comprising:

a control station;

a cloudlet communicatively coupled to the control station by a network, the cloudlet including a plurality of worker nodes;

a master node to control the plurality of worker nodes, the master node including at least one processor;

a memory storing instructions, wherein the instructions, when executed on the at least one processor, configure the at least one processor to receive a high-level task to be completed by a plurality of worker nodes controlled by the master node;

receive the high-level task at a task engine of the master node, wherein the task engine delegates the high-level task to a plugin of a plurality of plugins at the master node;

divide the high-level task into a plurality of low-level tasks using the plugin of the plurality of plugins;

retrieve network topology information corresponding to the cloudlet of the plurality of worker nodes;

generate a list of at least one worker node of the plurality of worker nodes for each of the plurality of low-level tasks based on a plurality of facts and a plurality of rules regarding the cloudlet using a rule engine, wherein the plurality of low-level tasks is individually executable by the at least one worker node; and assign each of the plurality of low-level tasks to an allocated at least one worker node of the list according to the network topology information using a task engine to determine an availability of the allocated at least one worker node to be assigned a low-level task using the network topology information and to assign the allocated at least one worker node based on the availability, wherein the allocated at least one worker node includes a feature selected by the rule engine within the network topology information, and wherein the rule engine is an expert system including the plurality of rules, the plurality of facts, and the network topology information and wherein the expert system is deterministic.

15. The system of claim 14, wherein the plurality of worker nodes comprises unmanned aerial vehicles.

16. The system of claim 14, wherein the master node requests a parameter from each of the plurality of worker nodes over the network, and wherein the parameter includes at least one of connectivity of the respective worker node to the master node, availability of the respective node within the network, and priority of the respective node within the network.

* * * * *